United States Patent [19]

Diel et al.

[11] Patent Number: 4,488,476
[45] Date of Patent: Dec. 18, 1984

[54] MARKER CONTROL VALVE

[75] Inventors: Robert M. Diel, Hutchinson; Richard C. Putnam, Nickerson, both of Kans.

[73] Assignee: The Cessna Aircraft Company, Wichita, Kans.

[21] Appl. No.: 436,910

[22] Filed: Oct. 27, 1982

[51] Int. Cl.³ .......................................... F15B 11/20
[52] U.S. Cl. ..................................... 91/513; 91/447; 91/470; 251/230; 137/624.14; 172/128; 172/130
[58] Field of Search .................. 91/447, 470, 513; 251/230; 137/624.14; 172/2, 128, 130, 209, 210, 211

[56] References Cited

U.S. PATENT DOCUMENTS

| 3,677,348 | 7/1972 | Boetto et al. ........................... 172/2 |
| 3,785,391 | 1/1974 | Miller ........................ 137/624.14 X |
| 4,067,394 | 1/1978 | Deckler .................................... 172/2 |
| 4,341,148 | 7/1982 | Kosarzecki ..................... 172/209 X |

FOREIGN PATENT DOCUMENTS 2216014 4/1972 Fed. Rep. of Germany ...... 172/130

Primary Examiner—Robert E. Garrett
Assistant Examiner—Timothy E. Nauman
Attorney, Agent, or Firm—Edward L. Brown, Jr.

[57] ABSTRACT

A sequencing valve utilized with a tractor-propelled planter having two row arms which pivot downward to the ground in an alternating sequence as the planter changes directions in the field. The sequencing valve is connected with the conventional hydraulic system which raises and lowers the planter at the end of each row so as to automatically lower alternate marker arms. This is achieved by pressurizing opposite ends of the sequencing valve spool for longitudinal movement through a cam means, causing the spool to rotate during movement in one direction whereby alternating lowering of the planter arms is achieved each time the planter is hydraulically lowered to the ground.

8 Claims, 4 Drawing Figures

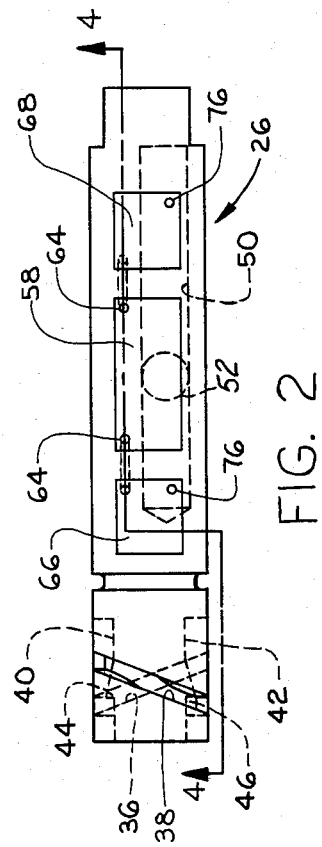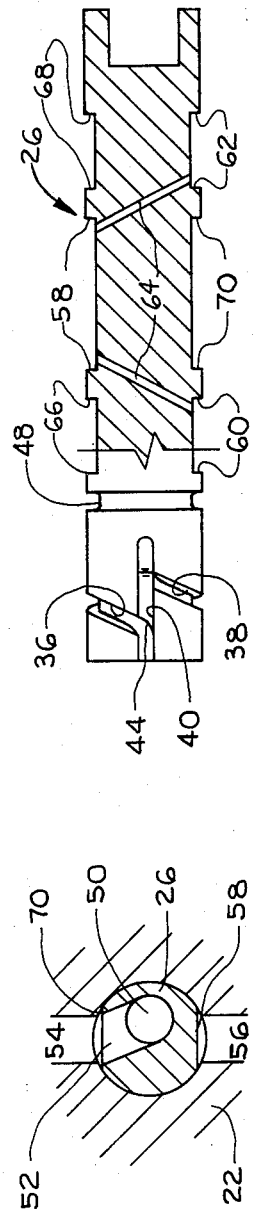

4,488,476

MARKER CONTROL VALVE

BACKGROUND OF THE INVENTION

The invention relates to an automatic sequencing valve which hydraulically lowers and raises a pair of row marker arms on a conventional row planter.

Most crops today are planted by large tractor-pulled planters which seed many rows on a single pass. On the return pass through the field, the farmer needs a reference line to steer to so that all the rows will be equally spaced across the field. Since the already planted rows are not easily distinquishable in the field, it has become necessary to establish some form of reference mark in the field away from the planted rows which the farmer can follow as he seeds the adjacent returning row.

The use of retractable row markers have long been in use and basically entail a pair of pivoting arms which have a small disc or other ground marking device on the end thereof for marking a reference line as a row is planted. At the end of the field, the farmer will lift his planter out of the ground to stop the seeding until the tractor and planter can be circled around for a return pass at which time the planter is again lowered into the ground. There have been a variety of mechanical and hydraulic methods for alternately raising and lowering the marker arms as the operator reverses direction at the end of the field; some of which have been manual while others have been automatic. The automatic systems for the most part have been tied to the planter lift cylinder so that as the lift cylinder raises the planter out of the ground, one or both of the marker arms are elevated, and as the planter is again lowered on the return pass, the opposite marker arm from the one previously lowered is dropped. Some of these automatic systems have been completely mechanical in nature, such as shown in U.S. Pat. Nos. 3,454,103 and 3,428,134. Automatic systems which utilize hydraulic cylinders for raising and lowering the marker arms in conjunction with the lift cylinder on the planter controlled by an automatic sequencing valve are typified in U.S. Pat. No. 4,067,394 to Deckler. In the last-mentioned patent the automatic sequencing valve is actuated by differing pressure drops across a valve spool.

SUMMARY OF THE INVENTION

The present invention comprises an automatic sequencing valve which utilizes pressure from the existing hydraulic system to shift its spool from one position to the other. The system does not depend upon pressure drops caused by flow through small orifices, as in the last-mentioned patent. Pressure drop systems of this type are quite susceptible to failing by reason of dirt, corrosion, oil viscosity or anything which changes the flow rate. The system of the present invention utilizes direct system pressure against the end of a cam means for alternately positioning the spool. When the planter is raised at the end of the field, check valves in the sequencing valve allow pump discharge pressure to pass the spool and raise both marker cylinders regardless of the spool position. As the marker cylinders are raising, the spool moves linearly in its bore by reason of pump pressure acting on one end of the spool. A cam follower pin engages a cam track in the end of the spool causing the spool to rotate as it moves in the bore. The rotation of the spool aligns a flow path of oil across the spool to a single marker cylinder while blocking flow to the other. When the machine is lowered to commence planting, the check valves will prevent flow from the marker cylinders, and only that marker cylinder aligned with the flow path will lower, while the opposite cylinder remains raised since the exhaust path is blocked. The pump pressure will act against the opposite end of the sequencing spool causing it to shift back in the opposite direction from its previous movement, however without rotation since the cam follower pin is now following a linear cam tract portion. Since the spool is not rotated on the lower stroke, the open flow path to the one cylinder remains the same. At the end of the row when the planter is again lifted, the spool again shifts backward and is rotated as it moves linearly by engagement of the cam follower with a second rotary cam track portion, causing the open flow path to be switched from one cylinder to the other.

It is therefore the principal object of the present invention to provide a new and improved automatic sequencing hydraulic valve usable on a row crop planter.

Another object of the present invention is to provide an improved automatic sequencing valve which is not sensitive to flow rates, viscosity of oil or contamination.

Other objects and advantages of the present invention will be more apparent to those skilled in the art from the detailed description which follows with references to the accompanying drawing wherein:

FIG. 2 is a longitudinal view of the valve spool;

FIG. 3 is a lateral section through the spool taken along lines 3—3 and of FIG. 1;

FIG. 4 is a longitudinal view of the valve spool partially in section taken along lines 4—4 of FIG. 2.

DESCRIPTION OF THE PREFERRED EMBODIMENT OF THE DRAWING

Figure 1:
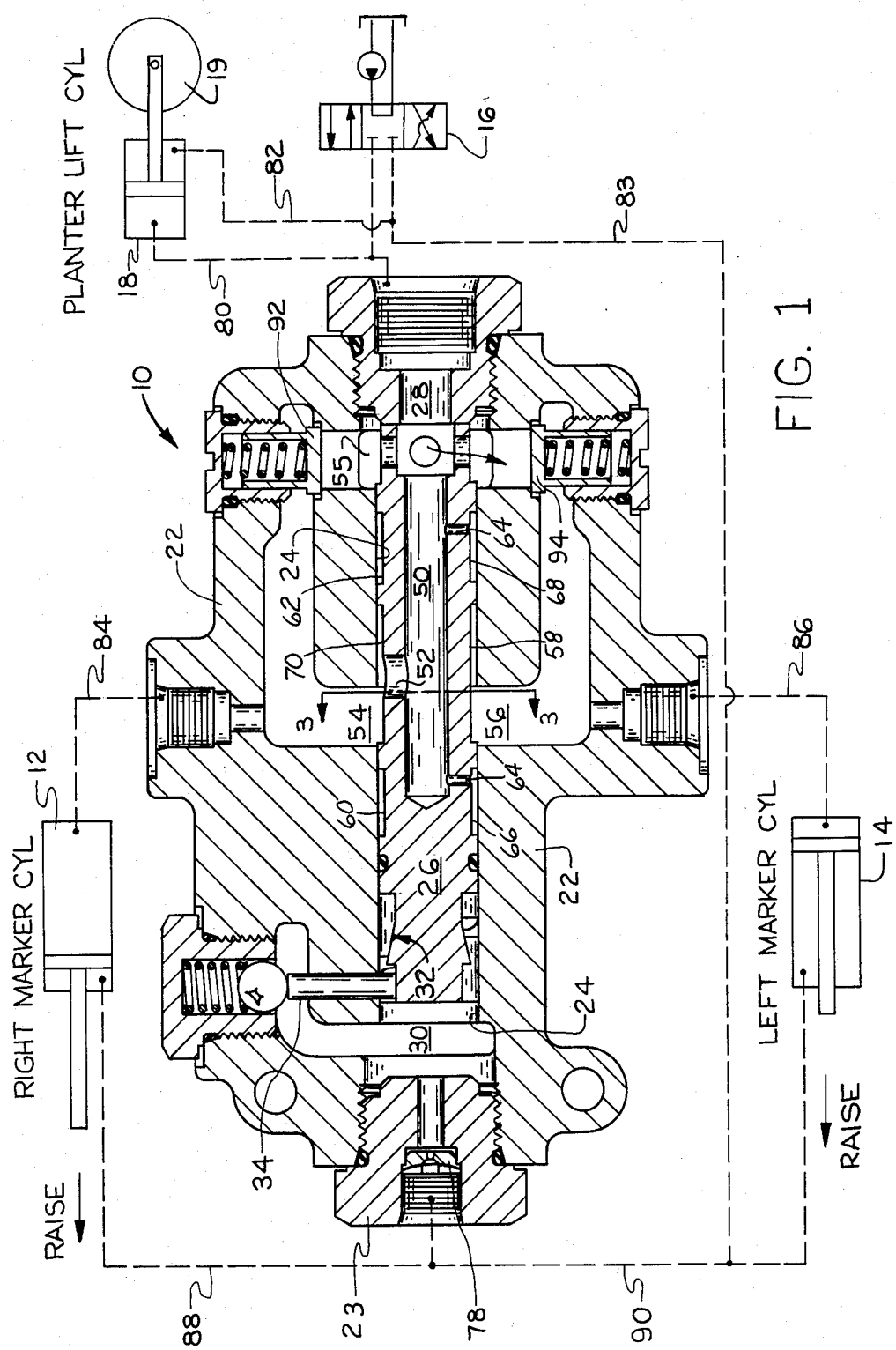
FIG. 1 is a longitudinal cross sectional view of the sequencing valve of the present invention with the associated circuitry shown schematically.

With reference to FIG. 1 of the drawing, the servo-operated automatic sequencing valve of the present invention is generally referred to by reference numeral 10. Valve 10 is positioned between a conventional control valve 16 and a pair of marker arm cylinders 12 and 14, which can be either double or single acting. Directional control valve 16 also supplies one or more planter lift cylinders 18 through lines 80 and 82. While the planter itself is not illustrated in the drawing, a symbolic wheel 19 is shown which rides on the ground and lifts the entire planter off the ground when the cylinder 18 is extended. Control valve 16 is illustrated as a 4-way three-position valve, however, the sequencing valve of the present invention works equally well with a 3-way system utilizing single-acting cylinders.

The double-acting marker arm cylinders 12 and 14 are illustrated without their marker arms and corresponding marker devices, all of which is well known in the art and illustrated in U.S. Pat. No. 4,067,394.

Sequencing valve 10 comprises a valve body 22 having a central bore 24 therethrough which receives valve spool 26. Bore 24 intersects servo chambers 28 and 30; right and left cylinder passages 54 and 56, and one-way passage 55. Servo chamber 30 connects to the lower or rod side of both right and left marker cylinders 12 and 14 via lines 88 and 90, respectively. Closing the left end of bore 22 is a plug 23 which contains an orifice 78 for controlling the speed of movement of the spool 26. Right marker cylinder passage 54 and left cylinder passage 56 are separate and unconnected, as best seen in FIG. 3. One-way passage 55 surrounds bore 24 and is always open to both right and left check valves 92 and 94, respectively. Intersecting servo chamber 30 is a spring-loaded cam follower pin 34 which engages various portions of a cam track generally described by reference numeral 32 located on the left end of spool 26.

Cam track 32 includes two rotary portions 36 and 38, as best seen in FIGS. 2 and 4. Each rotary portion 36 and 38 extends 180° around the spool and intersects with two linear track portions 42 and 40, respectively. Linear portion 40, as viewed in FIG. 2, has a ramp area 44 which drops sharply away as it intersects with rotary portion 36. The effect of this ramp is that as cam follower 34 moves from the right end of linear portion 40 to the left end, the spool only moves linearly as the pin 34 rides over ramp 44. However, when spool 26 moves in the opposite direction from the left end of linear portion 40 rightwardly, it is engaged by the elevated ramp causing it to follow rotary portion 36 through 180° of rotation until it engages the right end of linear portion 42, as best seen in FIG. 4. Linear portion 42 includes a similar ramp area 46 which also causes the cam follower to divert into rotary portion 38 as the spool moves in a leftward direction.

The overall effect of the rotary cam portions 36 and 38 and linear portions 40 and 42 are as follows: whenever the spool is moved in a rightward direction, it will not rotate, however, each time the spool is moved in a leftward direction, the spool will rotate through 180° of rotation so that spool opening 52 will disconnect from one cylinder passage and reconnect with another. Since spool 26 must be returned after each rightward movement, it alternately engages first rotary portion 36 and then rotary portion 38 on its next leftward movement which will also be referred to as the "raise" stroke of marker cylinders 12 and 14.

Valve spool 26 includes two force balancing areas 60 and 62 which are connected to an equivalent area 58 via connecting passages 64, as best seen in FIG. 4. Force balancing areas 68 and 66 are also connected to an equivalent area 70 on the opposite side of the spool through passages 76, and 50, as can be seen in FIGS. 2 and 1. The purpose of the balancing areas is to equalize the forces on spool 26 so as to prevent binding of the spool 26 in the bore 24.

OPERATION

The spool 26 of sequencing valve 10 is actuated by pressurizing opposite ends of the spool 26, either in servo chamber 28 or servo chamber 30. As the operator reaches the end of the field, he lifts the planter out of the ground by shifting directional control valve 16 to its straight through position pressurizing line 80 to extend the planter lift cylinder through line 80 and pressurize servo chamber 28. Fluid pressure on the right end of spool 26 has two flow paths, the first being through center passage 50 and 52 to the right marker cylinder 12 and the second being across both check valves 92 and 94 to both right cylinder 12 and left cylinder 14. Regardless of the previous positions of the marker cylinders 12 and 14, one or both will extend in the raise position of valve 16 and valve spool 26 will shift in a leftward direction, as viewed in the drawing. Any leftward lineal movement of spool 26 will cause the spool to rotate 180° as cam follower pin 34 follows rotary portion 36 of the cam track. As rotary portion 36 intersects lineal track portion 42, the spool will stop rotation, however it will extend a slight distance further in a lineal direction until pin 34 bottoms out in linear portion 42.

In this elevated or raised position, both marker cylinders are fully extended so that the connecting marker arms are elevated in the air as is the overall planter due to the extension of cylinder 18. The operator in this condition can either turn around for a return pass across the field or travel down the road in this inoperative mode.

As the operator has turned around for a return pass, he then shifts control valve 16 to its criss-cross lower position thereby pressurizing the lines 82, 83, 88 and 90. Servo chamber 28 is now open to drain along with the cap end of planter lift cylinder 18. Pump pressure is now on both rod ends of right and left marker cylinders 12 and 14 via lines 90 and 88, attempting to retract both cylinders. However, the return flow from the marker cylinders 12 and 14 in lines 84 and 86 respectively, is blocked by check valve 92 and 94 through one-way passage 55 with the only return flow path being through right cylinder passage 54 into passage 50 via lateral passage 52. Since left cylinder passage 56 is blocked, left marker cylinder 14 cannot retract and therefore remains extended while the right marker cylinder retracts and lowers its marking arm to the ground. While servo chamber 28 is open to drain, opposite servo chamber 30 is open to pump pressure across orifice 78 and line 90 causing spool 26 to shift in a rightward direction. Rightward movement of spool 26 will cause cam follower pin 34 to move to the left, relative to the spool 26, in its linear cam track portion 42, as can be seen in FIG. 2. Cam track portion 42 is linear, and as spool 26 moves to the right, pin 34 rides up ramp 46 and then drop off the edge of ramp 46, continuing linearly to the end of track portion 42. As the operator reaches the end of the field, he again raises the planter out of the ground and lifts the right marker cylinder 12 by shifting valve 16 to its straight through position. As the marker cylinder lifts due to flow across lift 92 and passage 54, the spool 16 again shifts leftwardly due to the pressure in servo chamber 28 while servo chamber 30 is connected to drain. This leftward movement of spool 26 again causes the spool to rotate 180° due to pin 34 following rotary portion 36 of the cam track thereby shifting valve opening 52 to the opposite side in communication with left marker cylinder return passage 56. As the operator again lowers the planter into the ground, left marker cylinder 14 will now extend instead of right cylinder 12, since lateral spool passage 52 to drain is now open to the left marker cylinder and the drain flow to the right marker cylinder is blocked.

Whenever the marker cylinders 12 and 14 are out of sequence for the particular position in the field, the operator merely needs to cycle valve 16 through additional raise and lower cycles to shift the lowered marker cylinder from one side to the other. Sequencing spool 26 upon the leftward movement in the valve 10 is prevented from following either of the linear cam track portions 40 or 42 by reason of the elevated lip or edge of ramp 44 or 46, and the fact that cam follower pin 34 is spring-biased against the camming surface.

Having described the invention with sufficient clarity to enable those familiar with the art to construct and use it, we claim:

1. A sequencing valve for automatically controlling a pair of planter marker arm cylinders in conjunction with the planter lift cylinder which raises and lowers the planter to and from an operative position, the sequencing valve comprising:

a valve body having a bore therein;

valve spool means positioned in the bore, having a first position which opens drain flow from the first marker cylinder while blocking the drain flow from the second marker cylinder, and a second position opening the drain flow from the second marker cylinder while blocking the drain from the first marker cylinder;

cam means connected to the spool means which rotates the spool alternately to its said first and second positions during each raise position of the planter lift cylinder; and servo means connected to the spool means for shifting the spool in opposite directions to a lower and raise position in conjunction with the lowering and raising of the planter cylinder.

2. A sequencing valve for automatically controlling a pair of planter marker arm cylinders in conjunction with the planter lift cylinder which raises and lowers the planter to and from an operative position, the sequencing valve comprising:

a valve body having a bore therein;

valve spool means positioned in the bore, having a first position, which pressurizes one side of both marker cylinders for raising same, and a second position which opens drain flow from the first marker cylinder while blocking the drain flow from the second marker cylinder, and a third position opening the drain flow from the second marker cylinder while blocking the drain from the first marker cylinder;

cam means connected to the spool means which rotates the spool alternately to its said second and third positions during each raise position of the planter lift cylinder; and servo means connected to the spool means for shifting the spool in opposite directions to a lower and raise position in conjunction with the lowering and raising of the planter cylinder.

3. A sequencing valve as set forth in claim 2, wherein the cam means comprises a cam follower in the valve body and a cam track on the spool, the track having a separate rotary portion which when engaged by the follower, causes the spool means to rotate alternately upon actuation to its second and third positions; the track having a linear portion whereby when the spool means moves in the opposite direction the follower rides in the lineal portion of the track.

4. A sequencing valve as set forth in claim 2, wherein the cam means comprises a spring-extended cam follower positioned in a second valve body bore and a cam track surrounding the spool means, the track having a rotary portion and a linear portion which intersect each other and a ramp means located on the cam track approximate the intersection which allows the cam follower to move in one direction to follow the rotary portion, and in the other direction to follow the linear portion.

5. A sequencing valve as set forth in claim 2, wherein the cam means comprises a spring-extended cam follower in the valve body and a cam track on the spool means, the track having two rotary portions and two linear portions which intersect each other and a ramp means located on the cam track approximate the intersection which allows the cam follower moving in one direction to follow the rotary portion, and in the other direction to follow the linear portion.

6. A sequencing valve as set forth in claim 2, wherein the cam means comprises a spring-extended cam follower in the valve body and a cam track surrounding the spool means, the track having a rotary portion which rotates the spool approximately 180° during actuation and a linear portion which intersects the rotary portion and a ramp means located on the cam track approximate the intersection which allows the cam follower movement in one direction to follow the rotary portion, and in the other direction to follow the linear portion.

7. A sequencing valve as set forth in claim 2, wherein the valve spool means includes flattened balancing areas on opposite sides of the spool with connecting passages between the areas whereby pressures on one side of the spool means are transferred to the opposite side in comparable areas so as to balance the lateral hydraulic forces on the spool.

8. A sequencing valve as set forth in claim 2, wherein the valve spool means includes two spaced balancing areas on one side of the spool means with an equivalent third balancing area on the opposite side of the spool means, all three of which are connected by passage means whereby any pressure in the third balancing area is transferred to the first and second areas on the opposite side thereof so as to equalize the lateral pressure load on the spool.

* * * * *